United States Patent [19]
Barwell

[11] 3,808,076
[45] Apr. 30, 1974

[54] METHODS AND APPARATUS FOR APPLYING TREAD TO TYRES OR WHEELS

[76] Inventor: John Harold Barwell, 13 Cranmer Rd., Cambridge, England

[22] Filed: May 3, 1971

[21] Appl. No.: 139,781

[30] Foreign Application Priority Data
May 7, 1970   Great Britain.................... 22184/70

[52] U.S. Cl.................... 156/96, 156/129, 156/405, 264/167, 264/171, 264/177, 264/323, 425/132
[51] Int. Cl.......................... B29h 5/04, B29h 17/36
[58] Field of Search ............ 156/112, 96, 129, 128, 156/128 T, 117, 397, 405, 406, 110, 394; 425/132; 264/177, 171, 167, 323

[56]   References Cited
UNITED STATES PATENTS

| | | | |
|---|---|---|---|
| 1,016,918 | 2/1912 | Duncan et al. | 156/129 |
| 1,424,134 | 7/1922 | Litchfield | 156/112 |
| 2,207,100 | 7/1940 | Maynard | 156/128 R |
| 3,472,714 | 10/1969 | Ragan | 156/128 R |
| 3,426,116 | 2/1969 | Walters | 264/167 |
| 2,009,524 | 7/1935 | Schmidt | 156/96 X |
| 3,274,322 | 9/1966 | Scudder | 156/112 X |
| 1,462,452 | 7/1923 | Kilborn et al. | 156/128 R |
| 2,710,425 | 6/1955 | Rhodes | 156/394 X |
| 2,411,659 | 11/1946 | Manning | 156/128 P |
| 3,515,618 | 6/1970 | Sidles | 156/128 R |
| 2,803,041 | 8/1957 | Hill et al. | 425/132 |
| 3,461,197 | 8/1969 | Lemelson | 425/132 |
| 3,473,986 | 10/1969 | Hureau | 264/167 |

*Primary Examiner*—Clifton B. Cosby
*Attorney, Agent, or Firm*—Merchant, Gould, Smith & Edell

[57] ABSTRACT

The specification discloses a method of applying tread material to tyres or wheels in which the tread material is extruded under pressure directly onto the periphery of the tyre or wheel to bond the material to the tyre or wheel. A tread pattern can be formed in the layer as it is extruded.

10 Claims, 5 Drawing Figures

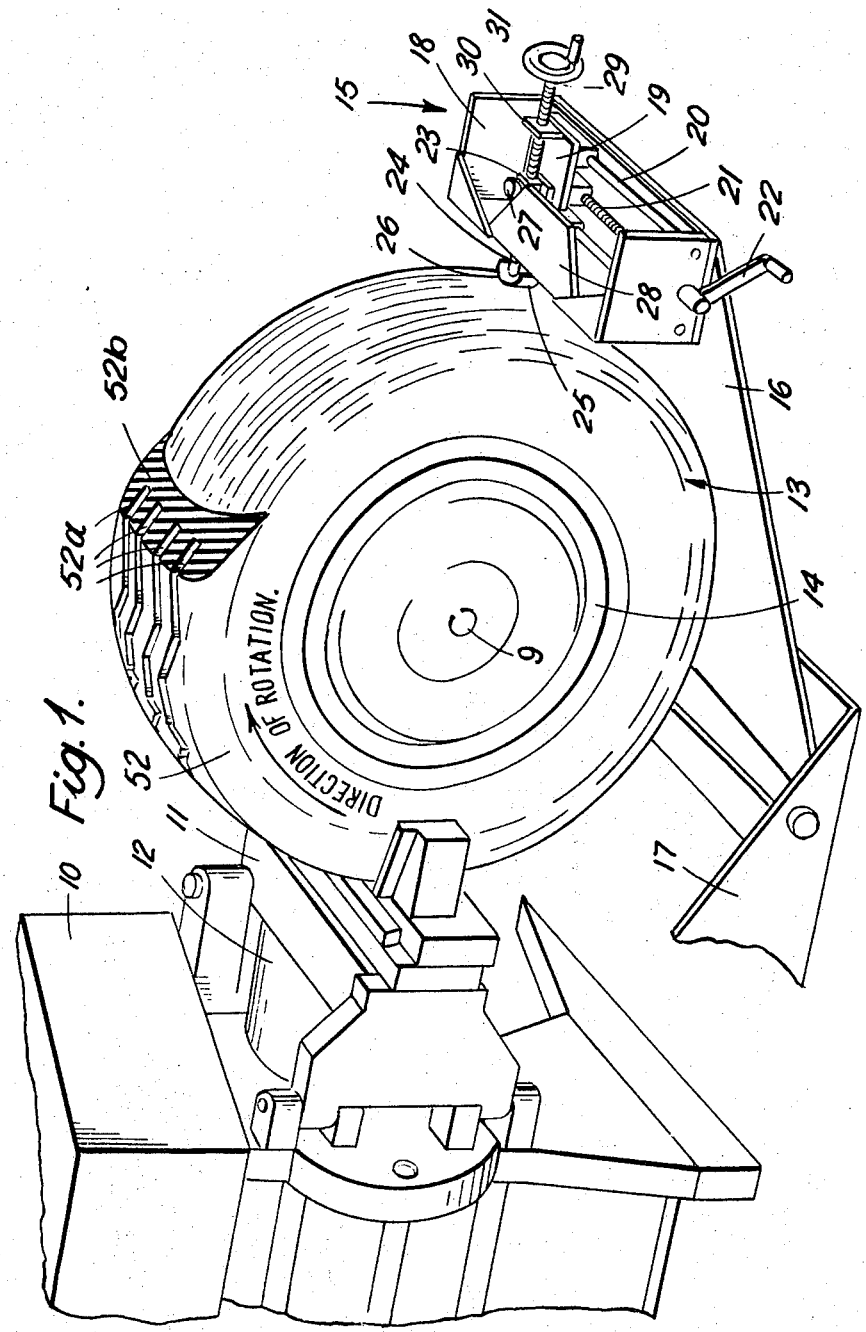

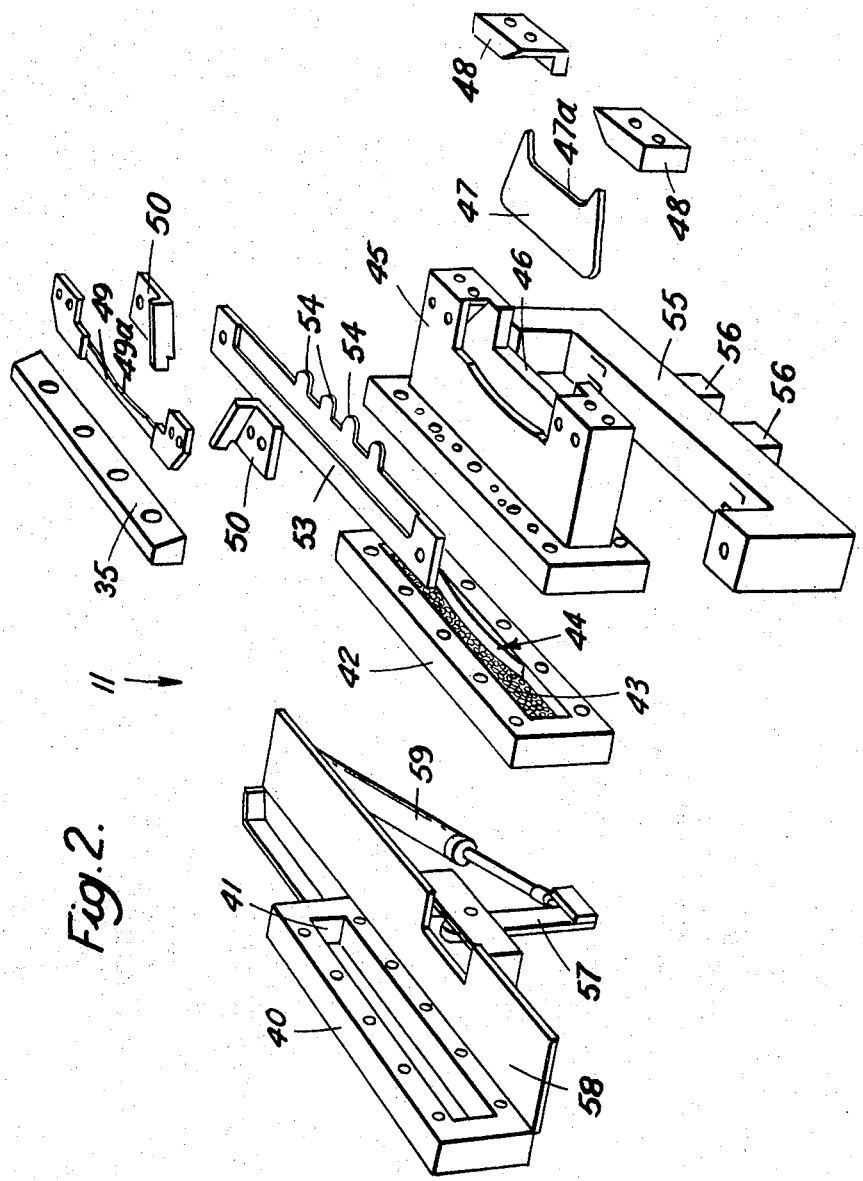

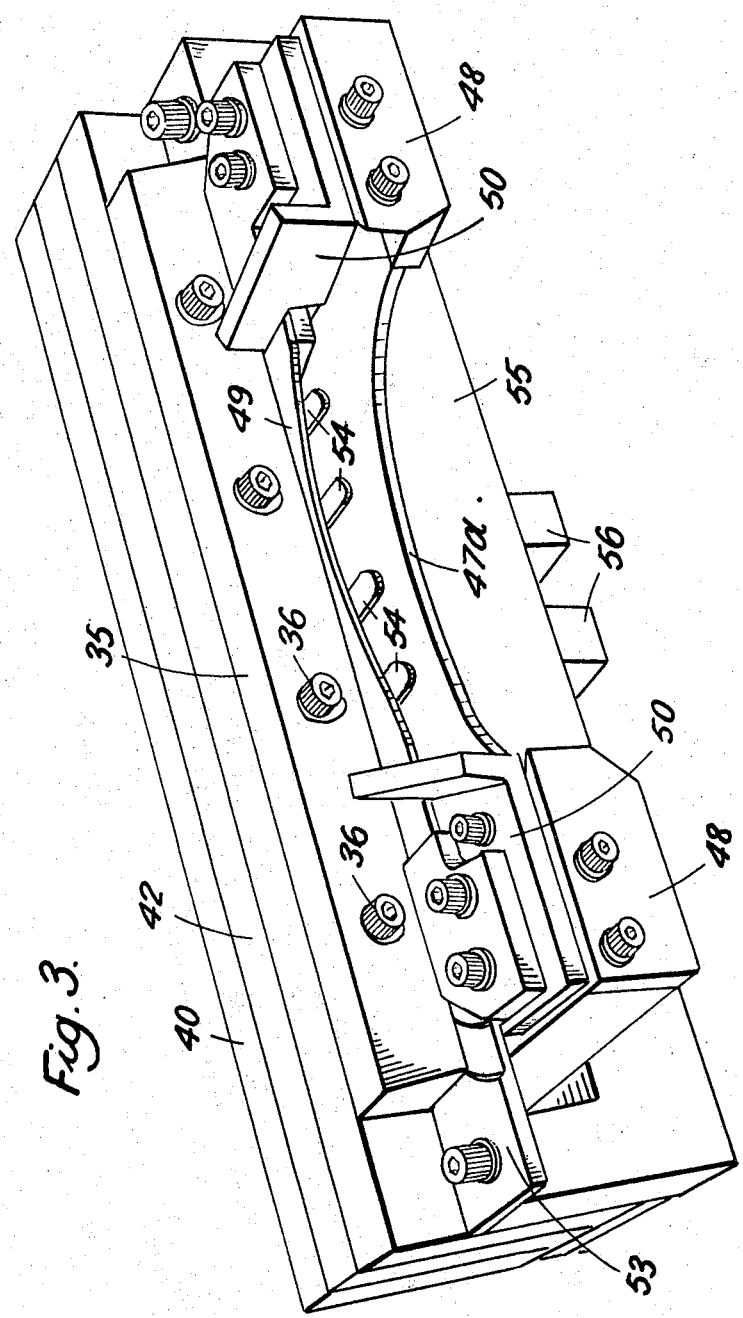

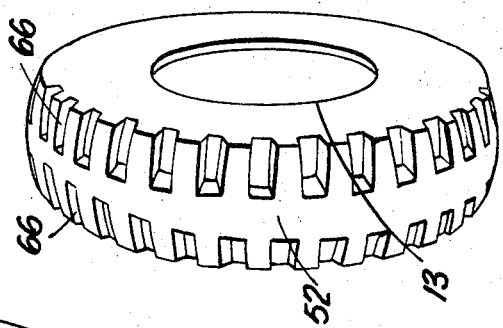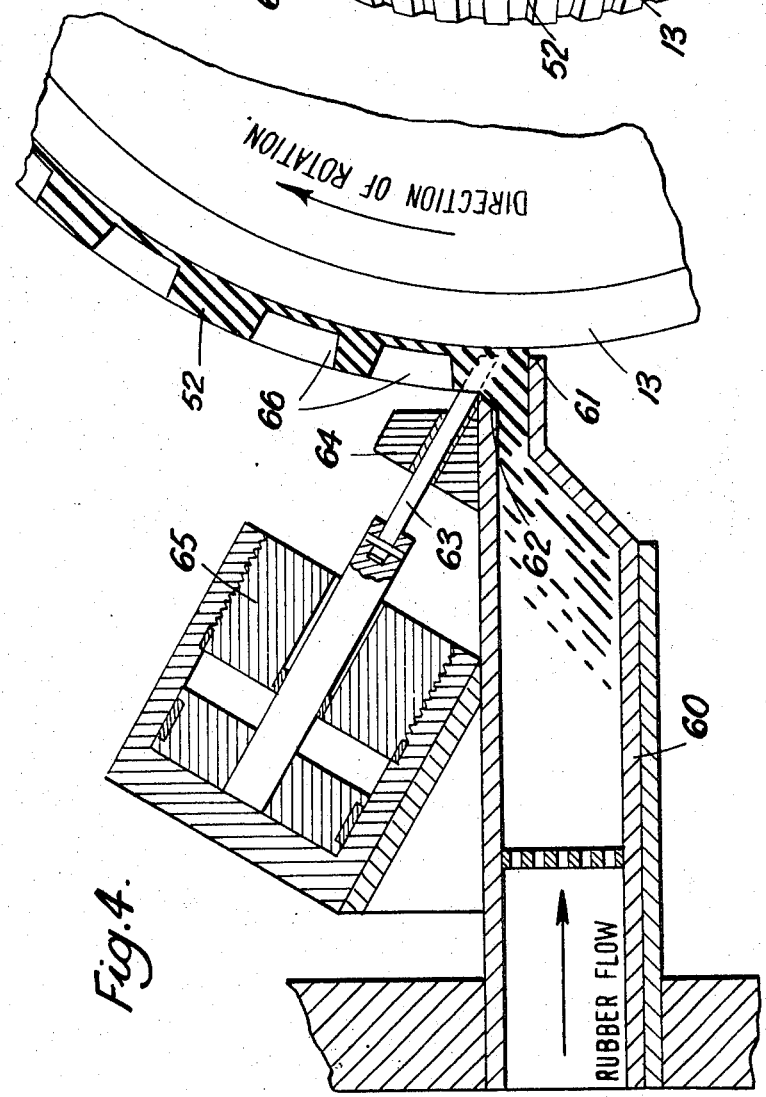

METHODS AND APPARATUS FOR APPLYING TREAD TO TYRES OR WHEELS

This invention relates to methods and apparatus for treading tyres or wheels.

The term wheels is intended to include rollers and like rotatable members. The term tyre is intended to include both solid and pneumatic tyres.

The invention provides a method of treading a tyre or wheel comprising extruding tread material under pressure directly onto the periphery of the tyre or wheel to form a layer of the material bonded around the periphery of the tyre or wheel.

The material may be extruded through a die having an outlet located immediately adjacent the periphery of the tyre or wheel and the die and tyre or wheel are rotated relative to one another during extrusion of material through the die the rate of extrusion of material from the die and the rate of rotation of the tyre or wheel being controlled in relation to one another to form a uniform layer of material around the periphery of the tyre or wheel.

The outlet of the die used may be shaped so that it is closed by the part of the periphery of the tyre or wheel to which the layer is to be applied except in one direction around the periphery of the tyre or wheel and the tyre or wheel is rotated relative to the die in said one direction.

The tread may be extruded along an axis extending radially of the tyre or wheel.

Tread pattern may be formed in the outer surface of the layer of material applied to the periphery of the tyre or wheel.

The tread pattern may be formed during extrusion of the material on to the periphery of the tyre or wheel.

The tread pattern may be formed, by interrupting part of the flow of material onto the tyre or wheel.

Flow of material to form the outer surface of the layer may be interrupted continuously at spaced locations across the flow to form continuous spaced channels around the outer surface of the layer.

The spaced locations where said flow is interrupted may be reciprocated continuously or intermittently across the direction of flow of material to form zig-zag or tortuous shaped channels in the outer surface of the layer.

In a further method flow of material to form the outer surface of the layer may be interrupted intermittently across the flow to form spaced lugs around the outer surface of the layer.

Alternatively or additionally tread pattern may be cut in the tread layer after it has been applied to the tyre or wheel.

In any of the methods referred to above material may be extruded on the periphery of the tyre or wheel and any excess material on the join in the layer is cut away from the layer.

In the case where a tread pattern is formed in the outer surface of the layer, the tread pattern may be cut in the outer surface of the layer at the join where the ends of the layer meet after any excess material has been cut away.

The end of the layer first applied may be bevelled during extrusion of the remainder of the layer onto the periphery of the tyre or wheel to provide an inclined face on to which the other end of the layer is extruded.

In any of the above arrangements the tyre may by inflated or otherwise supported during extrusion of the layer onto the periphery of the tyre so that the walls and crown of the tyre resist deflection due to the pressure of the extruded material.

The above methods are particularly applicable to retreading of tyres in which case worn tread is peeled off or otherwise removed prior to the application of fresh tread material directly to the resultant periphery of the tyre.

In any of the methods referred to above the tread material may be a plastics material.

For example the tread material may be a rubber which is applied to the periphery of the tyre or wheel in uncured state and the tyre or wheel is then subjected to treatment to cure the rubber tread.

The rubber may be cured by subjecting the tyre or wheel to a heated and pressurised atmosphere.

In any of the methods referred to above the tyre or wheel with the applied tread layer may be subjected to a moulding operation.

In the case where the tread material is extruded through a die the die may be fixed and the tyre or wheel may be rotated past the die, and the rate of extrusion of material through the die is determined by the speed of rotation of the tyre or wheel.

The invention also provides an apparatus for treading tyres or wheels comprising a die having an outlet, means for extruding tread material through the die, means for mounting a tyre or wheel with the periphery of the tyre or wheel immediately adjacent the outlet of the die and means for moving the die and wheel or tyre relative to one another so that a layer of material from the die is applied under pressure to the periphery of the tyre or wheel.

The outlet of the die may be shaped so that it is closed by the periphery of the tyre or wheel except in one direction around the periphery of the tyre or wheel.

Means may be provided for forming tread pattern in the outer surface of the layer in the outlet of the die.

Said means may comprise a number of fingers which project from the outlet of the die to form channels in the outer surface of the layer of material.

Means may be provided for reciprocating continuously or intermittently said fingers in a direction transverse to the direction of flow of material from the outlet so that the fingers form zig-zag or tortuous channels around the layer of material.

Alternatively controlled means may be provided for intermittently interrupting part of the flow of material from the outlet to form spaced lugs extending across the outer surface of the layer.

The following is a description of some specific embodiments of the invention reference being made to the accompanying drawings in which:

FIG. 1 is a perspective view of an apparatus for retreading motor vehicle tyres;

FIG. 2 is an exploded view of a die of the apparatus shown in FIG. 1;

FIG. 3 is a perspective view of the die shown in FIG. 2;

FIG. 4 is a sectional view through an alternative form of die; and

FIG. 5 is a perspective view of a tyre produced by the die of FIG. 4.

Referring firstly to FIG. 1 of the drawings there is shown a part of a volume controlled hydraulic ram extruder 10 of the type described in U.S. Pat. Specification No. 1141033. The cylinder of the ram is filled with a pre-heated rubber suitable for forming a tyre tread. A die 11 is mounted at the outlet end of the cylinder 12 of the ram. The die 11 in detail shown indetail in FIGS. 2 and 3 of the drawings and will be described later.

A worn pneumatic tyre 13 to be re-treaded is fitted and inflated on a wheel 14 which is mounted for rotation about a horizontal axis on a hub 9. The hub 9 is mounted on a carrier (not shown) which is movable towards and away from the extruder. A variable speed electric motor (not shown) is drivably connected to the hub for rotating the wheel. The tyre is located by the carrier so that the axis of the die extends radially of the tyre.

Before re-treading of the tyre starts the worn tread is removed using the cutting mechanism indicated at 15 which is located diametrically opposite the die 11 around the tyre. The cutting mechanism 15 is supported on an inclined platform 16 secured at its lower end to a base structure 17 of the apparatus. The cutter mechanism comprises an open box 18 in which a carriage 19 is slidably mounted on parallel rods 20 extending parallel to the axis of the wheel 14 between the sides of the box. A screw threaded shaft 21 extending parallel to the rods 20 is also mounted at its ends in the sides of the box and engages in a screw threaded bore in the carriage 19. One end of the shaft 21 carries a crank handle 22 for rotating the shaft to displace the carriage 19 along the rods 20. A housing 23 is mounted on the carriage 19 and a rod 24 projects from the housing towards the periphery of the tyre. The end of the rod 24 remote from the housing carries a gouge 25 having a cutting edge 26 at one circumferential end. Projecting from the top of the housing is a pin and a cam follower wheel 27 is rotatably mounted on the pin. The wheel 27 is engageable with a peripheral edge of a cam plate 28 mounted on the structure 18 and the edge of the cam plate is shaped to correspond to the required profile of the carcass of the tyre to be treaded. A screw threaded shaft 29 extending transverse to the shaft 21 engages in a screw threaded bore in a lug 30 on the carriage. One end of the shaft is rotatably mounted in the housing 23 and the other end carries a wheel 31 for rotating the shaft. Rotation of the shaft draws the housing across the carriage 19.

The wheel 14 is rotated at high speed by the electric motor and the crank handle 22 and the wheel 31 are turned to draw the carriage 19 from one end of the box to the opposite end and at the same time maintain the wheel 27 in contact with the cam plate 28. The gouge 25 moves over the periphery of the tyre including the shoulders of the tyre to cut away the worn tread and leave the carcass of the tyre with the required profile. Different cam plates 28 and wheels 27 are used for different sized tyres.

Reference is now made to FIGS. 2 and 3 of the drawings which shows the die 11 in detail. The die through which rubber is forced from the ram cylinder 12 comprises a head 40 having an elongate rectangular aperture 41. Located on the outlet side of the head 40 is a frame 42 in which a modulating screen 43 is located. The aperture in the frame downstream of the screen 43 is rectricted at the centre of the frame as indicated at 44 and this together with the screen 43 ensures that there is an even flow rate of rubber across the die. The screen may be further shaped to promote flow rate of the rubber at the extremities of the screen.

Downstream of the frame is a die housing 45 which comprises a hollow box like structure with an outlet 46 formed in the downstream end of the housing which is U-shaped as viewed in plan. The housing 45 is engaged by a clamping member 35 which is secured by bolts 36 which extend through bores in the housing and screen 43 to the die head 40 to clamp the housing, screen and head together. The outlet 46 is sufficiently large to accept a peripheral part of a range of differently sized tyre carcasses to be re-treaded.

To adapt the outlet 46 of the housing to suit tyre carcasses of different sizes a bottom plate 47, side plates 48, an inner top plate 49 and outer top plates 50 are secured to the housing around the outlet. The bottom plate 47 has a recess 47a corresponding to the contour of the outer part of the tyre carcass to which tread is to be applied. The location of the tyre to be treaded is adjusted so that the carcass clears the periphery of the recess 47a but prevents any downward flow of rubber from the die.

The side plates are set to rub lightly on either side of the carcass at limits to which the rubber which forms the shoulders of the tread is to be applied. The inner top plate 49 is spaced from the outer surface of the carcass by a distance corresponding to the required depth of tread to be applied to the carcass and the edge 49a of the plate adjacent the carcass is shaped to form a tread of the required outer profile. The width and shape of the sides or shoulders of the tread are controlled by the outer top plates 50 which are located at the ends of the plate 49.

Thus when the tyre is located adjacent the die as described above the tyre carcass closes the die except in the upward direction and, in effect, forms an additional wall to the die. The tyre carcass which is inflated to withstand the pressure of extrusion, is rotated in the direction shown by the arrow on FIG. 1 by the electric motor at slow speed so that the tyre carcass moves upwardly past the die as rubber is extruded at a rate determined by the speed of rotation of the carcass onto the carcass to form a tread layer 52.

A slider 53 extends across the housing having four laterally projecting fingers 54 which pass beneath the plate 49 and project beyond the edge 49a of the plate 49. The slider is mounted on the upturned ends of a bar 55 located below the housing 45 and the underside of the bar is formed with two downwardly projecting lugs 56. The lugs engaged around the opposite sides of one end of a pivoted lever 57 mounted on a fixed part 58 of the die below the housing. The lever 57 is oscillated by a double acting ram 59 and the resulting reciprocation of the slider 53 causes the fingers 54 which project into the extruded material being applied to the tyre carcass to form zig-zag channels 52a (see FIG. 1) in the outer surface of the tread 52 as it is extruded onto the tyre carcass.

Referring again to FIG. 1 of the drawings during extrusion of tread onto the carcass the beginning of the layer of tread is bevelled as shown at 52b with an electrically heated cutting wire or other cutting apparatus. When the bevelled end 52b of the layer reaches the die, material is extruded over the bevelled surface and simultaneously the carrier is moved to draw the tyre carcass away from the die. Extrusion is then stopped and the excess material is cut away using the cutting wire.

The tyre is then placed in a steam autoclave or other pressurised apparatus and the new tread material vulcanised. Finally continuations of the tread pattern formed by the fingers 54 are cut at the location where the excess extrudate was trimmed away at the end of the extruding operation.

Reference is now made to FIG. 4 of the drawings which show a die for producing a lug tyre tread as illustrated in FIG. 5.

The die 60 has an outlet 61 shaped to correspond closely to the outer surface of the carcass to be treaded except along the upper edge 62 of the outlet which is cut back from the carcass by a distance corresponding to the required tread depth. As the rotation of the carcass moves the outer surface upwardly past the die a tread layer is applied to the carcass.

Two fingers 63 (only one can be seen) are mounted on the die in guides 64 at opposite ends of the edge 62. The fingers are reciprocated into and out of alternative edge portions of the tread 52 as it leaves the die by rams 65 mounted on the die to form voids 66 in the edge portions of the tread layer 52 first on one side and then on the opposite side as can be seen in the finished tyre shown in FIG. 5. It will be appreciated that by varying the length of time for which the fingers are projected into the tread, varying the shape of the fingers and the strokes of the rams different tread patterns can be obtained.

It is found that tyres treaded or re-treaded as described above have comparable appearance and qualities of tyres provided with treads using conventional moulding techniques. Moulding of a tyre results in internal stresses in the tyre which are avoided by extrusion of the tread material onto the tyre carcass. Furthermore extrusion of the tread material onto the carcass removes the necessity of filling any voids in the surface of the carcass to be coated and no bonding cement is required. Also the number of separate operations is reduced and the apparatus required is simpler as compared with that required for conventional moulding techniques.

There are many modifications which may be made to the above described embodiments without departing from the scope of the invention. For example in the die shown in FIGS. 2 and 3 the shaping of the fingers 54 on the slider 53 may be rectangular or asymmetric section. The fingers 54 may be held stationary during extrusion so that the channels formed are straight instead of zig-zag. The fingers may also be reciprocated intermittently to form tortuous tread patterns. Rotatable assymetric fingers may be used. The fingers and slider may be removed so that a plain tread is formed. In the latter case cutters may be located downstream of the die to cut a tread pattern in the tread layer of material. The tread may be cut after curing of the material. In any of the above arrangements patterned rollers may be provided either at the location of the dies or downstream of the dies in either of the above embodiments for embossing a pattern on the sides or shoulders of the newly formed tread layer.

In the case where a smooth tread layer is applied to the tyre carcass the tyre can then be cured in a mould in a conventional manner.

In a further modification of the apparatus shown in FIGS. 1 to 3, the slider 53 and top plate 49 may be combined in a single element which is reciprocated in an arcuate path corresponding in curvature to the outer face of the required tread.

In place of the volume controlled ram extruder a continuous ram extruder of the type described in British Pat. Specification No. 12745/69 and suitably modified to be volume controlled or a suitable controlled screw extruder or other forcing machine may by used.

The above methods are also applicable to the manufacture of new pneumatic tyres in which a new carcass is manufactured and a new tread layer is then applied as described earlier. The carcass may need surface preparation.

I claim:

1. A method of treading a tyre or wheel, comprising rotating the tyre or wheel relative to a die, extruding tread material having a profile corresponding to that of a required tread layer, under pressure directly onto the periphery of the tyre or wheel, through an outlet of the die shaped so that it is closed by part of the periphery to which the layer of tread is to be applied except in one direction around the periphery of the tyre or wheel, using the extrusion pressure to simultaneously form a layer of the material and bond the material around the periphery of the tyre or wheel, and controlling the rate of extrusion of material from the die and the rate of rotation of the tyre or wheel in relation to one another to form a layer of material of desired profile and to provide satisfactory bonding of the material to the periphery of the tyre or wheel.

2. A method as claimed in claim 1, including simultaneously extruding the material onto the periphery of the tyre or wheel and forming the tread pattern therein.

3. A method as claimed in claim 2, including interrupting part of the flow of extruded material onto the tyre or wheel to form the tread pattern.

4. A method as claimed in claim 3, including continuously interrupting the flow of extruded material which forms the outer surface of the layer at spaced locations across the flow to form continuous spaced channels around the outer surface of the layer.

5. A method as claimed in claim 4, including reciprocating the spaced locations where said flow is interrupted, continuously or intermittently across the direction of flow of material to form zig-zag or tortuous shaped channels in the outer surface of the layer.

6. A method as claimed in claim 2, including intermittently interrupting flow of material to form the outer surface of the layer across the flow to form spaced lugs around the outer surface of the layer.

7. An apparatus for treading a tyre or wheel comprising a die having an outlet, means for extruding tread material through the die at a controlled rate, means for mounting a tyre or wheel with the periphery of the tyre or wheel immediately adjacent the outlet of the die and means for moving the die and wheel or tyre relative to one another so that a layer of material having a profile corresponding to that of a required tread layer is, under the pressure of extrusion, simultaneously applied from the die and bonded to the periphery of the tyre or wheel, said outlet of the die being shaped so that it is closed by the periphery of the tyre or wheel except in one direction around the periphery of the tyre or wheel.

8. An apparatus as claimed in claim 7 wherein means are provided for forming tread pattern in the outer surface of the layer at the outlet of the die, said means comprising a number of fingers which project into the outlet of the die to form channels in the outer surface of the layer of material.

9. An apparatus as claimed in claim 8 wherein means are provided for reciprocating continuously or intermittently said fingers in a direction transverse to the direction of flow of material from the outlet to form zigzag or tortuous shaped channels around the layer of material.

10. An apparatus as claimed in claim 7 wherein controlled means are provided for intermittently interrupting part of the flow of material from the outlet to form spaced lugs extending across the outer surface of the layer.

* * * * *